United States Patent
Iwamura et al.

(12) 
(10) Patent No.: US 6,388,684 B1
(45) Date of Patent: May 14, 2002

(54) METHOD AND APPARATUS FOR DISPLAYING A TARGET REGION AND AN ENLARGED IMAGE

(75) Inventors: Kazuaki Iwamura, Hachioji; Yasuyuki Kikuchi, Ibaraki-ken; Kazuo Watanabe, Sagamihara; Masakazu Matsuo; Yoshizo Ito, both of Hitachi, all of (JP)

(73) Assignees: Hitachi, Ltd., Tokyo; Hitachi Information & Control Systems, Hitachi; Hitachi Seiko, LTD, Ebina, all of (JP)

( * ) Notice: Subject to any disclaimer, the term of this patent is extended or adjusted under 35 U.S.C. 154(b) by 0 days.

(21) Appl. No.: 08/058,199

(22) Filed: Jun. 25, 1993

Related U.S. Application Data

(63) Continuation of application No. 07/551,302, filed on Jul. 12, 1990, now abandoned.

(30) Foreign Application Priority Data

Jul. 14, 1989 (JP) ............................................. 1-180343

(51) Int. Cl.⁷ ................................................. G06F 3/14
(52) U.S. Cl. ...................................................... 345/788
(58) Field of Search ................................. 345/115, 118, 345/119, 127, 131, 788

(56) References Cited

FOREIGN PATENT DOCUMENTS

| JP | 62-271070 | 11/1987 |
|---|---|---|
| JP | 63-187331 | 8/1988 |
| JP | 63-298572 | 12/1988 |

*Primary Examiner*—Jeffery Brier
(74) *Attorney, Agent, or Firm*—Antonelli, Terry, Stout & Kraus, LLP

(57) ABSTRACT

An image displaying method and apparatus for simultaneously displaying an enlargement target of an entire original image and its enlarged image on a display screen by automatically disposing the enlarged image. The image displaying apparatus includes display for displaying an enlarged image of part of the entire original image including characters, patterns, etc. in a relation superposed on the entire original image, input apparatus for pointing to specify the enlargement target in the entire original image, and automatic disposing apparatus for preferentially specifying and computing the values of the area of the enlargement target region, the area of the enlarged image display region and the enlargement ratio so as to maximize one of these values and disposing the enlarged image on the basis of the result of computation. Further, in order that the enlarged image is easily visible, the enlargement target region and the enlarged image display region are disposed and displayed on the display screen so that a peripheral region adjoining the enlargement target region is displayed between these two regions.

30 Claims, 13 Drawing Sheets

FIG. 1A
ENLARGED MAP
DISPLAY REGION
MAXIMUM MODE
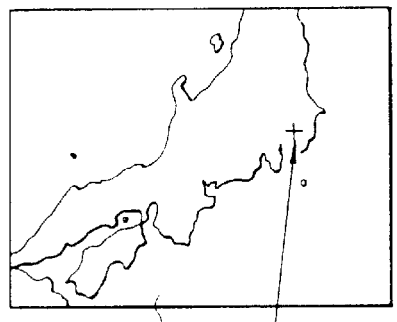
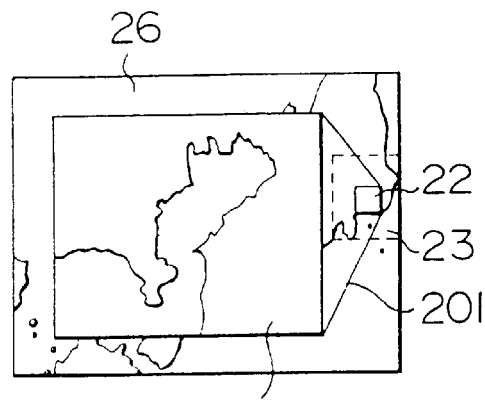
26  SPECIFIED POINT
FIG. 1B
ENLARGEMENT
TARGET REGION
MAXIMUM MODE
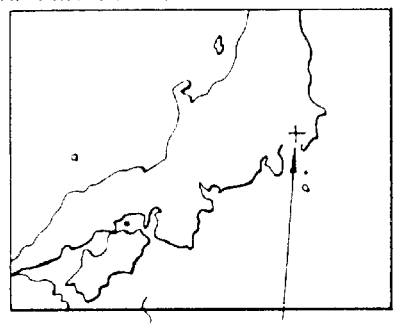
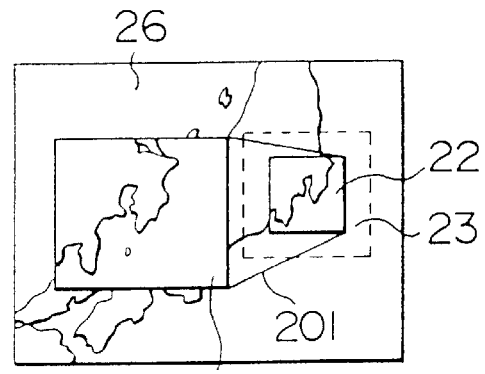
26  SPECIFIED POINT
FIG. 1C
ENLARGEMENT
RATIO
MAXIMUM MODE
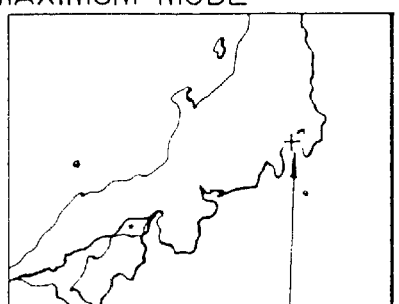
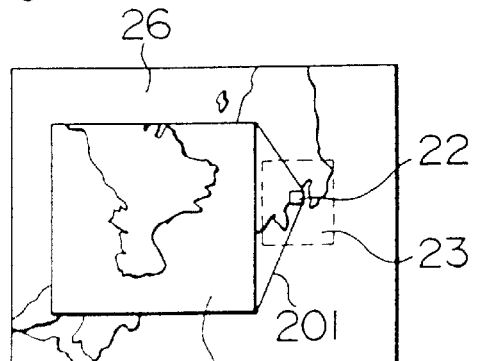
26  SPECIFIED POINT

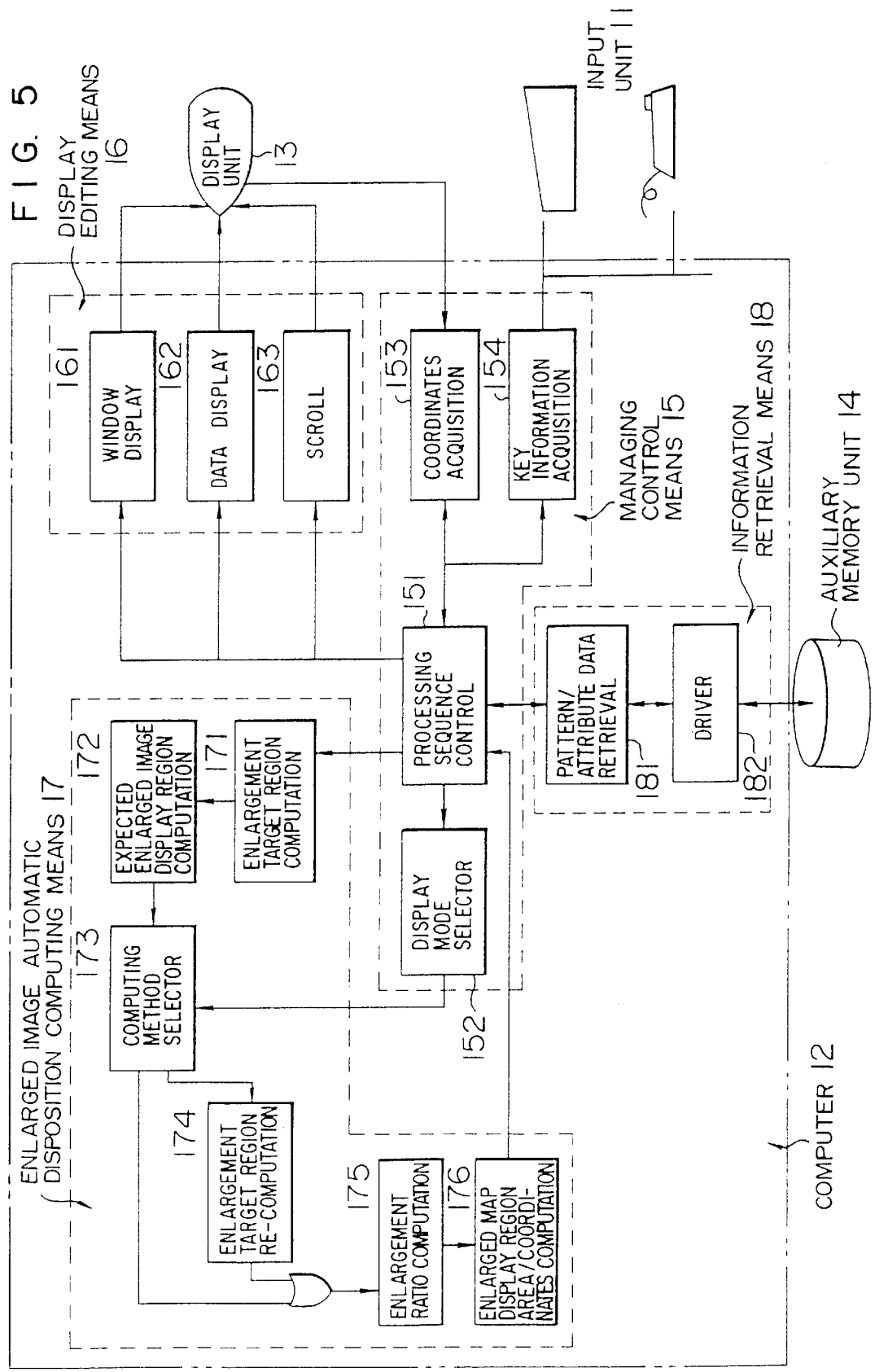

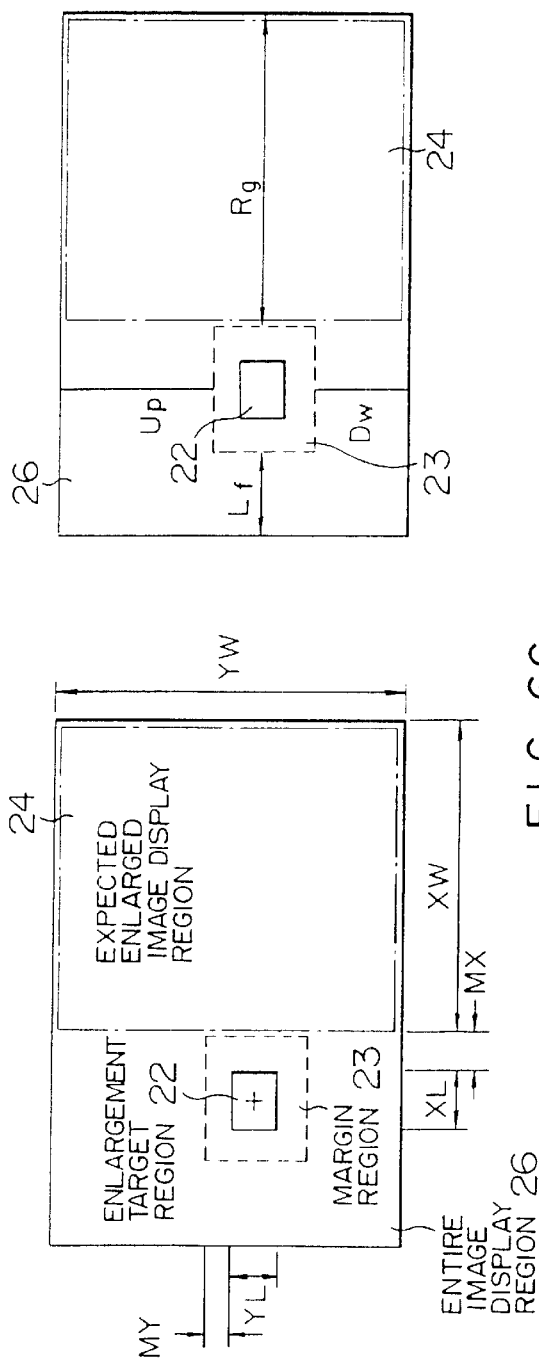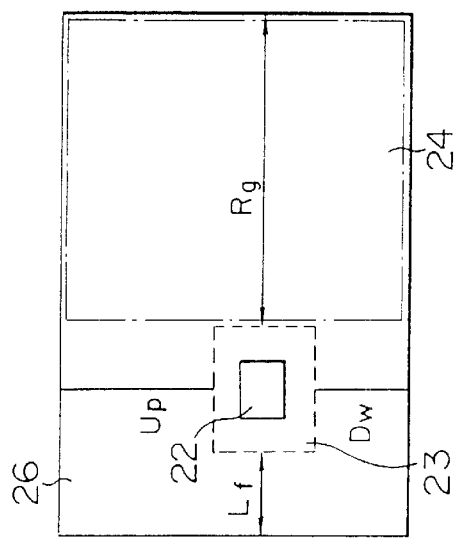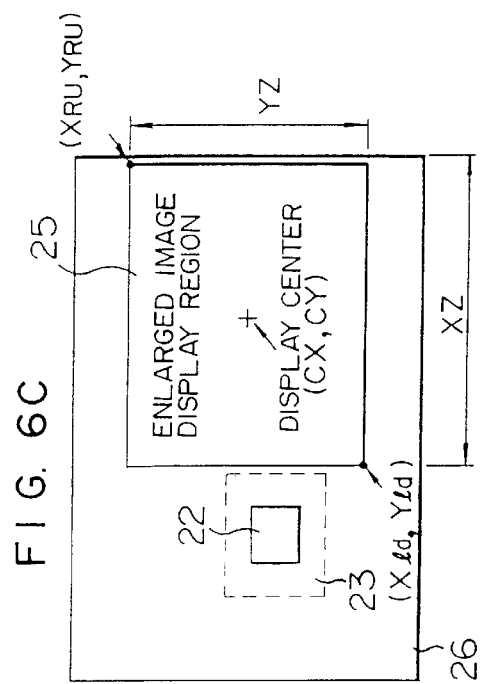

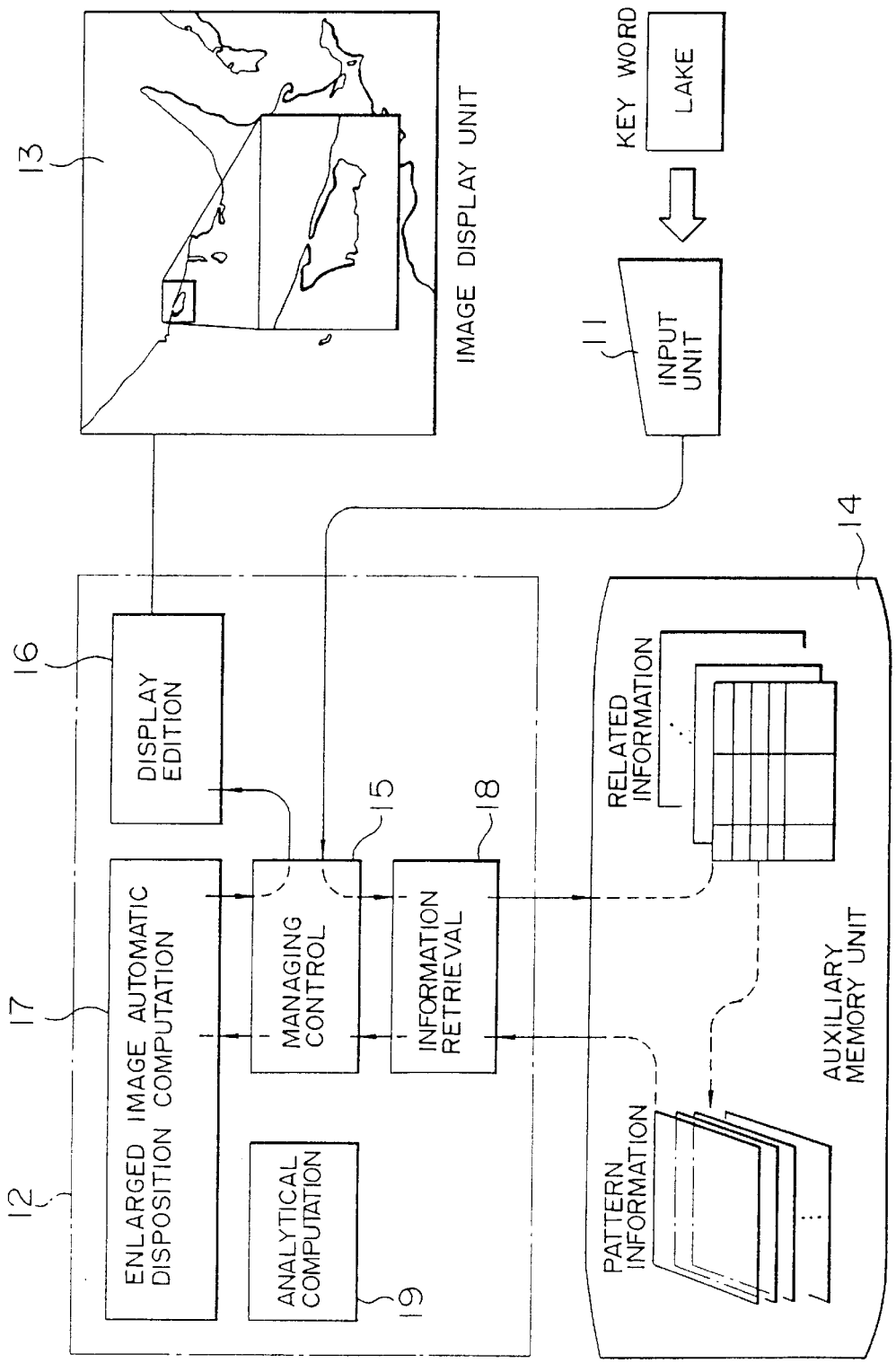

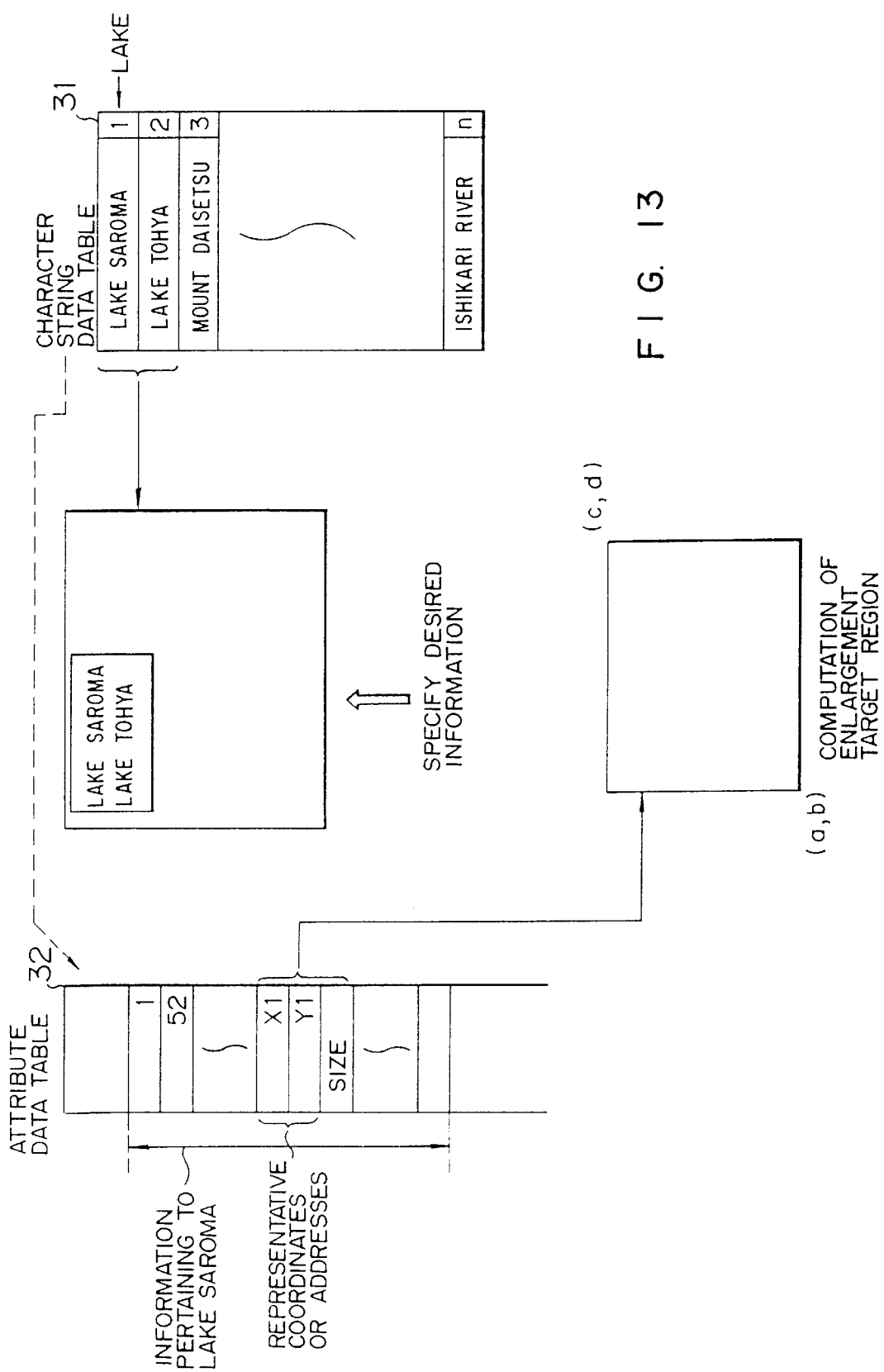
F I G. 13

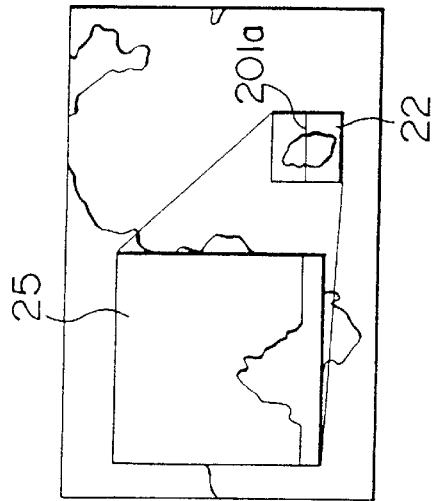
FIG. 14A SECTIONAL FIGURE
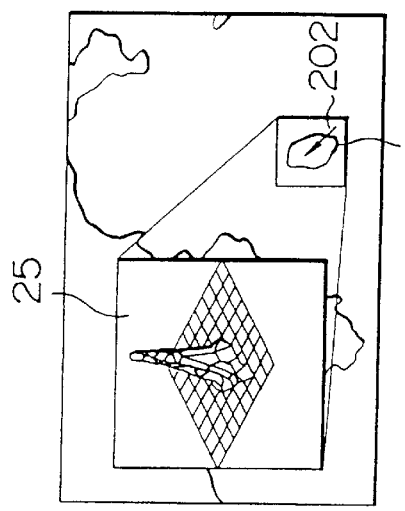
FIG. 14B SPACE FIGURE
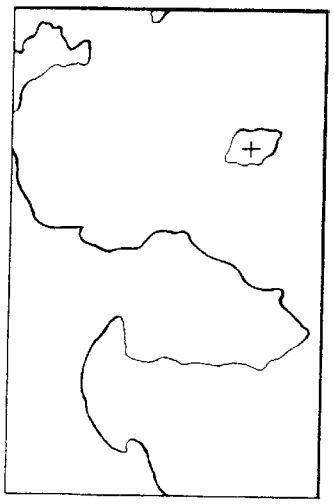
FIG. 14D
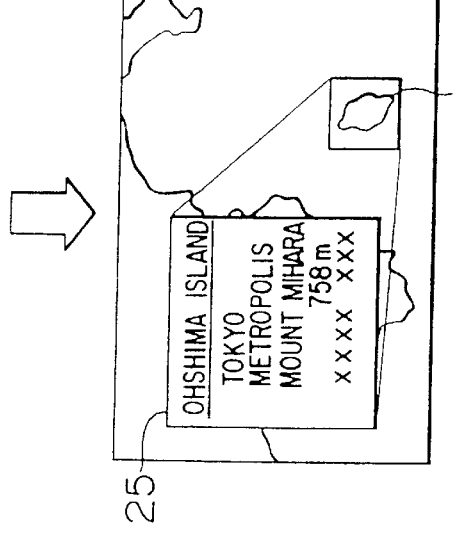
FIG. 14C CHARACTER INFORMATION

METHOD AND APPARATUS FOR DISPLAYING A TARGET REGION AND AN ENLARGED IMAGE

This is a continuation divisional of application Ser. No. 07/551,302, filed Jul. 12 1990; now abandoned.

BACKGROUND OF THE INVENTION

This invention relates to a method and apparatus for displaying an image or the like on a display screen, and more particularly to a method and apparatus for simultaneously displaying an enlargement target region and its enlarged equivalent on the same display screen.

It has been demanded to provide a method for enlarging part of a map or the like displayed on a display screen. In an attempt to meet the above demand, a method for separately displaying an enlarged map only on a display screen is proposed in, for example, JP-A-62-153889. The disclosure of the cited application will be described with reference to FIGS. 2A and 2B. FIG. 2A shows an entire original road map 1 including a target region 2 to be enlarged on a display screen. After enlargement of the target region 2, the entire original road map 1 including the target region 2 is erased on the display screen to be replaced by an enlarged map 3 of the target region 2. FIG. 2B shows that the enlarged map 3 only of roads in the target region 2 is displayed on the display screen.

However, according to the proposed method, of JP-A-62-153889 the positional relation of the enlarged road map 3 of the target region 2 in the entire original road map 1 cannot be accurately recognized.

FIGS. 3A and 3B show application of the proposed method of JP-A-62-153899 for an enlarged display of a contour map. FIG. 3A shows an original contour map 1, and FIG. 3B shows an enlarged contour map 3 of a target region 2. However, with the enlarged contour map 3 only, it is impossible to accurately identify the details of linkage among the contour lines.

JP-A-62-35983 proposes a method for displaying both an enlarged pattern and its original pattern on the same display screen as shown in FIGS. 4A and 4B. FIG. 4A shows that a point located at the upper left corner of a target region 2 to be enlarged is externally specified thereby setting the target region 2 to be enlarged. This target region 2 is shown by a dotted square in FIG. 4A. Then, a point located at the upper left corner of an enlarged pattern display region and an enlargement ratio are specified so as to set the enlarged pattern display region. FIG. 4B shows both the enlarged pattern 3 and its original pattern 2. A raster scanning method is used to display the enlarged pattern 3. The manner of raster scanning is such that, as soon as scanning of the enlarged pattern display region is to take place, the data reading system is switched for reading data of the enlargement target region 2, and the scanning speed is changed from the standard speed to that used for enlargement.

The related art method disclosed in JP-A-62-153889 cited above has such problems to be solved from the aspect of ease of visibility that, because no consideration is taken for displaying an enlarged map of a target region in relation to the target region, the positional relation of the enlarged target region in the entire original map as well as the configuration of the enlarged map cannot be accurately recognized.

Also, in the case of the method disclosed in JP-A-62-35983 cited above in which an original pattern and its enlarged pattern are simultaneously displayed on the same display screen, the enlargement ratio and the position of displaying the enlarged pattern must be externally specified. Thus, this related art method has such problems to be solved from the aspect of manipulatibility that the enlarged pattern tends to become extremely small depending on the enlargement ratio, or, in a contrary case, the enlarged pattern tends to become extremely larger than the whole area of the display screen, and the enlargement ratio must be re-set.

SUMMARY OF THE INVENTION

With a view to solve the problems pointed out above, it is an object of the present invention to provide a method and apparatus of the type for simultaneously displaying both a target region to be enlarged in an entire original image and its enlarged image on the same display screen, in which the enlarged image to be displayed is automatically disposed on the display screen.

Another object of the present invention is to provide a method and apparatus of the type described above in which the enlargement target region and its enlarged image are readily visibly disposed and displayed on the same display screen so that the enlarged image can be readily accurately recognized.

Still another object of the present invention is to provide a method and apparatus of the type described above in which, while shifting the enlargement target region along a linear or the like on the display screen, its enlarged image is automatically disposed and displayed on the same display screen at the same time, so that the method and apparatus can be effectively utilized for the purpose of navigation.

Other objects of the present invention will become apparent from the following detailed description made in conjunction with the accompanying drawings.

An embodiment of the image displaying apparatus of the present invention comprises displaying means for displaying an enlarged image of part of an entire original image including characters, patterns, etc. in a relation superposed on the entire original image, input means for pointing to specify an enlargement target in the entire original image, and automatic disposing means for preferentially specifying computing the values of the area of the enlargement target region, the area of the enlarged image display region and the enlargement ratio, so that one of these values becomes equal to a predetermined one or a maximum, and disposing the enlargement target region and the enlarged image display region so as to be readily distinguished from each other on the display screen.

Further, in order that the enlarged image is readily visible, the enlargement target region and the enlarged image display region are disposed and displayed on the display screen so that a peripheral region adjoining the enlargement target region is disposed between the enlargement target region and the enlarged image display region.

According to the apparatus of the present invention constructed as described above, an enlargement target region including a specified target to be enlarged and an enlarged image of the target are automatically disposed on the same display screen so as to be readily distinguished from each other. That is, when a point on the display screen is pointed to specify an enlargement target region, a minimum region having a minimum or nearly minimum area that can be recognized on the display screen provides the enlargement target region. Usually, a basic region which is n times (n: a predetermined integer) as large as the minimum region is automatically set. Then, an expected enlarged image display region having a greatest margin is selected on the display screen in relation to the basic region, and the enlarged image is displayed on the selected expected display region. The purpose of preferential specifying in this case is that the enlarged image display region has a maximum or nearly maximum area. The terms "maximum" and "minimum" are used in the specification of the present application to designate not only the maximum and minimum values but also practical values close to them.

Further, when the area of the enlargement target region is to be maximized, the enlargement ratio is selected to be a minimum, and, under the condition where the length of the line connecting the center of the basic region and the expected enlarged image display region is kept constant, the areas of these two regions are re-computed. On the other hand, when the enlargement ratio is to be maximized, the area of the enlargement target region is limited to that of the minimum region described above.

Thus, by preferentially specifying the priority of one of the area of the two regions and the value of the enlargement ratio over the others, thereby correspondingly changing the other values, the enlarged image, which is readily visible and has a high degree of flexibility, can be automatically disposed and displayed on the display screen.

When fixation of the areas of the two regions and the value of the enlargement ratio at predetermined or specific values cannot attain the required condition, the entire original image including the enlargement target region is automatically scrolled on the display screen, and the regions are then automatically disposed on the display screen.

In order that the enlargement target region and the enlarged image can be clearly distinguished from each other, a space is provided at the boundary between these two regions and a peripheral region adjoining the enlargement target region is displayed in this space. By displaying the peripheral region, the contents of the enlargement target region and the enlarged image can be readily compared with and clearly distinguished from each other not only when the enlargement target region and the enlarged image are disposed in a non-overlapping relation but also when they may overlap each other.

According to the present invention, the enlarged image can be automatically disposed in a location outside an erase-inhibited region of the entire original image.

According to the present invention, the enlargement target region can be specified by not only pointing to the minimum region on the display screen but also pointing to a line (a linear pattern) on the display screen. That is, while shifting the enlargement target region along the line, the corresponding enlarged image can be continuously and automatically disposed on the display screen.

Also, according to the present invention, besides directly specifying the enlargement target region by pointing on the display screen, the enlargement target region can be specified by retrieval of display data or associated data by means of, for example, a key word input.

Also, according to the present invention, the enlarged image displayed on the enlarged image display region represents not only the enlarged detail itself of the enlargement target region but also-information related to the target region, for example, a sectional figure, an illustrational on explanatory figure or attribute information.

BRIEF DESCRIPTION OF THE DRAWINGS

FIGS. 1A, 1B and 1C show, by way of example, various enlarged maps automatically disposed and displayed according to the enlarged image displaying method of the present invention.

FIG. 5 is a functional block diagram showing the general structure of an embodiment of the enlarged image displaying apparatus according to the present invention.

FIGS. 6A, 6b and 6C illustrate the manner of automatic disposition of an enlarged image.

FIGS. 12 and 13 illustrate the manner of setting the enlargement target region in response to a key word input.

FIGS. 14A, 14B, 14C and 14D illustrate the manner of displaying related information of the enlargement target on the enlarged image display region.

DESCRIPTION OF THE PREFERRED EMBODIMENTS

Figure 2A:
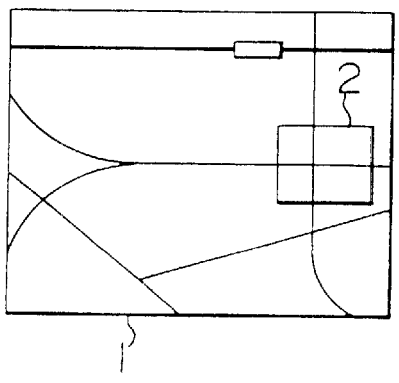
FIGS. 2A, 2B; 3A, 3B; 4A and 4B show examples of various enlarged maps and patterns displayed according to related art methods.
Figure 2B:
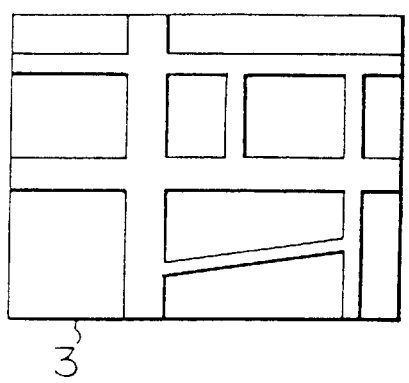
Figure 3A:
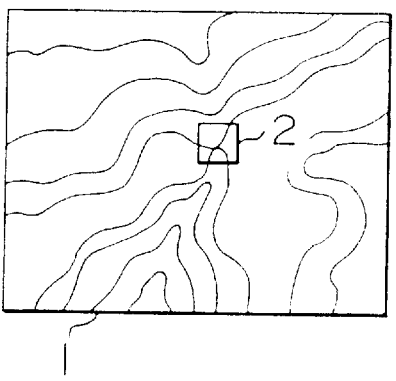
Figure 3B:
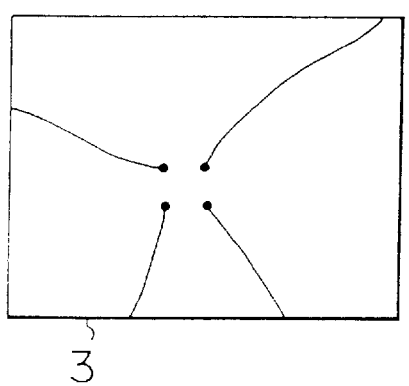
Figure 4A:
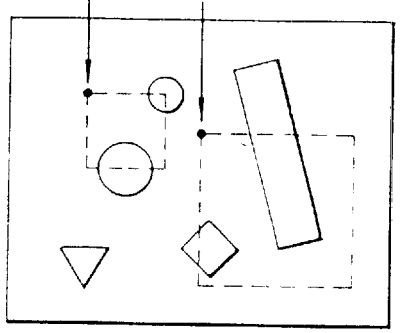
Figure 4B:
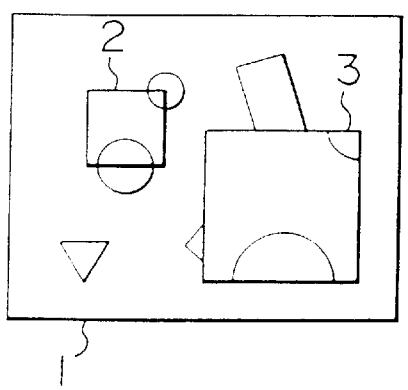

Preferred embodiments of the present invention will now be described in detail with reference to the drawings.

FIG. 5 shows the general structure of an embodiment of the enlarged image displaying apparatus according to the present invention when used as a image display. Referring to FIG. 5, the apparatus comprises an input unit 11 for applying a pattern specifying input or a key word input, a computer 12 carrying out processing for automatically disposing an enlarged image on a display screen, a CRT display unit 13 having a window display function, and an auxiliary memory unit 14 storing pattern display information and related information as vector data or raster data.

The computer 12 includes managing and control means 15 for managing and controlling the operation of the individual function of the apparatus, display editing means 16 for carrying out display edition by processing image display data, automatic disposition computing means 17 for computing and determining an enlarged image display region, and information retrieval means 18 for seeking pattern information and related information to be displayed.

The detailed structure of each of the means 15 to 18 will now be described.

The managing and control means 15 includes a processing sequence control part 151 actuating the individual functional units according to a processing sequence for displaying an enlarged image, a display mode selector part 152 selecting one of a first mode in which the area of the enlarged image display region is maximized, a second mode in which the area of the enlargement target region is maximized and a third mode in which the value of the enlargement ratio is maximized, a coordinate acquisition part 153 acquiring, from the display unit 13, the coordinates of a point pointed to by the input unit 11, and a key information acquisition part 154 acquiring key information generated and applied from the input unit 11.

The display editing (control) means 16 includes a window display part 161 displaying the enlarged map display region on the display screen of the display unit 13 when the coordinates values of the enlarged image display region are supplied as its input, a data display part 162 for displaying pattern data on the enlarged image display region, and a scroll part 163 shifting the entire original image or the enlargement target region by scrolling so as to secure the enlarged image display region when the enlargement target region is located in the vicinity of the central area of the display screen.

The automatic disposition computing means 17 for computing and determining the enlarged image display region includes an enlarged target region computing part 171 computing the area and center of the enlarged target region, an expected enlarged-image display region computing part 172 computing a region considered to be most suitable for displaying the enlarged image, a computation mode selector part 173 changing over the routine of the processing program depending on whether the enlarged image display region maximum mode, the enlargement target region maximum mode or the enlargement ratio maximum mode is selected by the display mode selector part 152, an enlargement target region re-computing part 174 for re-computing the area of the enlargement target region on the basis of the selected location of the enlarged image display region in the enlargement target region maximum mode, an enlargement ratio computing part 175 computing the enlargement ratio of the window, and an area and coordinate computing part 176 computing the area of the enlarged image display region and the coordinates of the center of the enlarged image display region.

The information retrieval means 18 includes a pattern and attribute retrieval part 181 seeking a pattern and its attribute information to be displayed by actuating a data base, and a driven 182 actuated for seeking the required pattern and attribute information from the auxiliary memory unit 14.

The manner of automatic disposition of an enlarged image according to the present invention will now be described with reference to FIGS. 6A, 6B and 6C with the steps being illustrated by the flow charts shown in FIGS. 8A, 8B and 8C. Referring first to FIG. 6A, an enlargement target region 22 is a rectangular region formed around a point specified by a pointing device such as a mouse. This region 22 has a minimum area that can be recognized on the display screen when enlarged. Usually, a basic region whose area is n times (n: a suitable integer selected as required) as large as that of the minimum region is automatically set step (801 and 802). In FIG. 6A, this enlargement target region 22 has an area of XL×YL, where XL is the length in the horizontal direction of the display screen, and YL is the length in the vertical direction of the display screen.

A margin region 23 having widths MX and MY is set to adjoin the enlargement target region 22. An expected enlarged image display region 24 is set in an entire display region 26 of the display screen and is in the form of a largest rectangular region lying outside the margin region 23 (step 803). Thus, as shown in FIG. 6B, the distances from the vertical and horizontal sides of the rectangular margin region 23 to the corresponding sides of the entire display region 26 are computed, and the expected enlarged image display region 24 is set in the direction of the largest distance $R_T$. In FIG. 6A, this region 24 is located on the right-hand side of the margin region 23 and has lengths XW and YW in the X- and Y-directions respectively. The ratios between RX in the X-direction and RY in the Y-direction are computed for all the sides of the enlargement target region 22 and the expected enlarged image display region 24, and the smaller one of these ratios is selected as the enlargement ratio R, as follows (step 804):

$$R=MIN(RX, RY)$$

where RX=XW/XL, and RY=YW/YL.

FIG. 6C shows an enlarged image display region which is determined on the basis of the enlargement ratio R thus computed (step 805). The center of the expected enlarged image display region 24 has its coordinate values CX, CY, and the enlargement target region 22 has its lengths XL and YL in the X- and Y-directions respectively. In this case, the lower left point and the upper right point of the rectangular enlarged image display region 25 have their coordinate values $X_ld$, $Y_ld$ and $X_{Ru}$, $Y_{Ru}$ given by the following equations respectively:

$$X_{ld} = CX - \frac{XL*R}{2}, Y_{ld} = CY - \frac{YL*R}{2}$$

$$X_{Ru} = CX - \frac{XL*R}{2}, Y_{Ru} = CY - \frac{YL*R}{2}$$

Therefore, the enlarged image display region 25 has the lengths XZ and YZ given by the following expressions respectively:

$$XZ=XL*R, YZ=YL*R$$

The above description refers to the sequence of processing executed so as to maximize the area of the enlarged image display region 25.

Figure 7A:
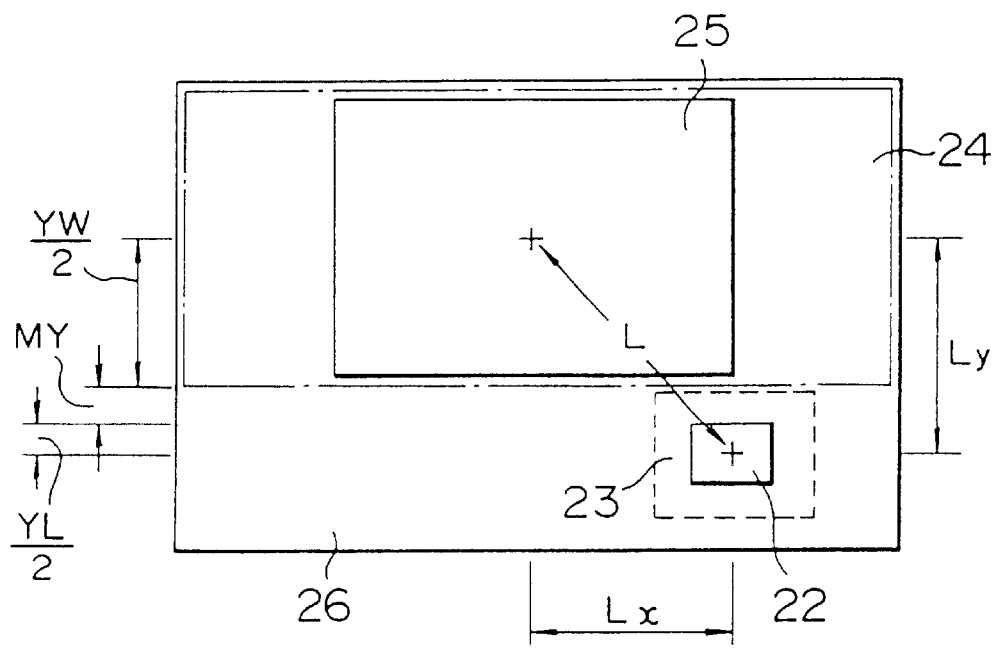
FIGS. 7A and 7B illustrate the manner of automatic disposition when the area of an enlargement target region is selected to be a maximum.
Figure 7B:
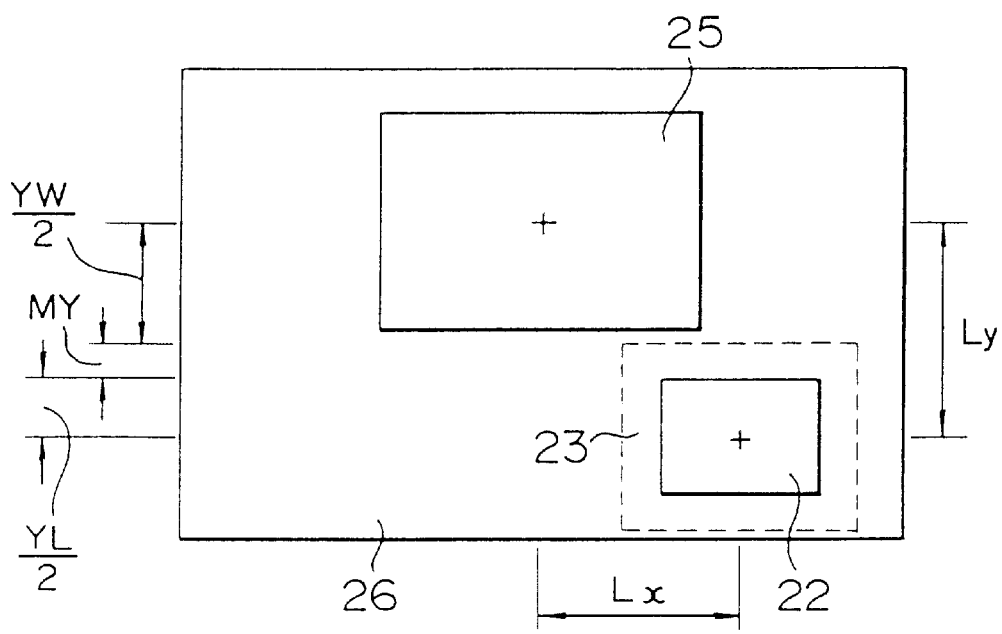

The sequence of processing for maximizing the area of the enlargement target region 22 will now be described with reference to FIGS. 7A and 7B (step 806–813). FIG. 7A shows the case where the expected enlarged image display region 24 is located above the enlargement target region 22 (the basic region herein), and the length of the straight line connecting the centers of these two regions is L. The Y-direction component Ly of the length L is $$Ly = \frac{XL}{2} + \frac{YW}{2} + MY$$

The value of XL' which maximizes the area of the enlargement target region 22 is computed under the assumption that the length Ly is constant, that is, the length L is also constant. In this case, the enlarged image will be useless when the value of the enlargement ratio R is excessively small. Such a problem is usually solved by setting such a condition that, as soon as the enlargement target region maximum mode is preferentially specified, the enlargement ratio R is selected to be larger than 2, and the area of the enlargement target region 22 is selected to be smaller than about ¼ of the entire display region 26. The sequence of processing executed in this case will now be described.

When now the enlargement ratio R is set at 2, the value of XL' maximizing the area of the enlargement target region 22 is given by $$XL' = \frac{1}{2}YW'$$

$$Ly = \frac{YL'}{2} + \frac{YW'}{2} + MY = \frac{3}{2}YL' + MY$$

Therefore, the value of YL' is computed as follows:

$$YL'=\frac{2}{3}(Ly-MY)$$

The value of YL' is set at $$YL' = \frac{1}{4} Y_{max}$$

when the value of YL' is larger than ¼ of the maximum value $Y_{max}$ of the length of the entire display region 26 in the Y-direction. On the basis of the value of YL' thus obtained, the area of the enlarged map display region 25 is determined so that its coordinate values on the display screen can be determined. The above description refers to the computation of the area of the enlargement target region 22 on the basis of the Y-direction component YL'. It is apparent that the area of the enlargement target region 22 can be similarly computed on the basis of the X-direction component when the expected enlarged image display region 24 is located on either side of the enlargement target region 22 in the horizontal direction.

The processing for maximizing the enlargement ratio R can be realized by setting the area of the enlargement target region 22 at the area of the minimum region in the processing described above for maximizing the area of the enlargement target region 22.

Figure 8A:
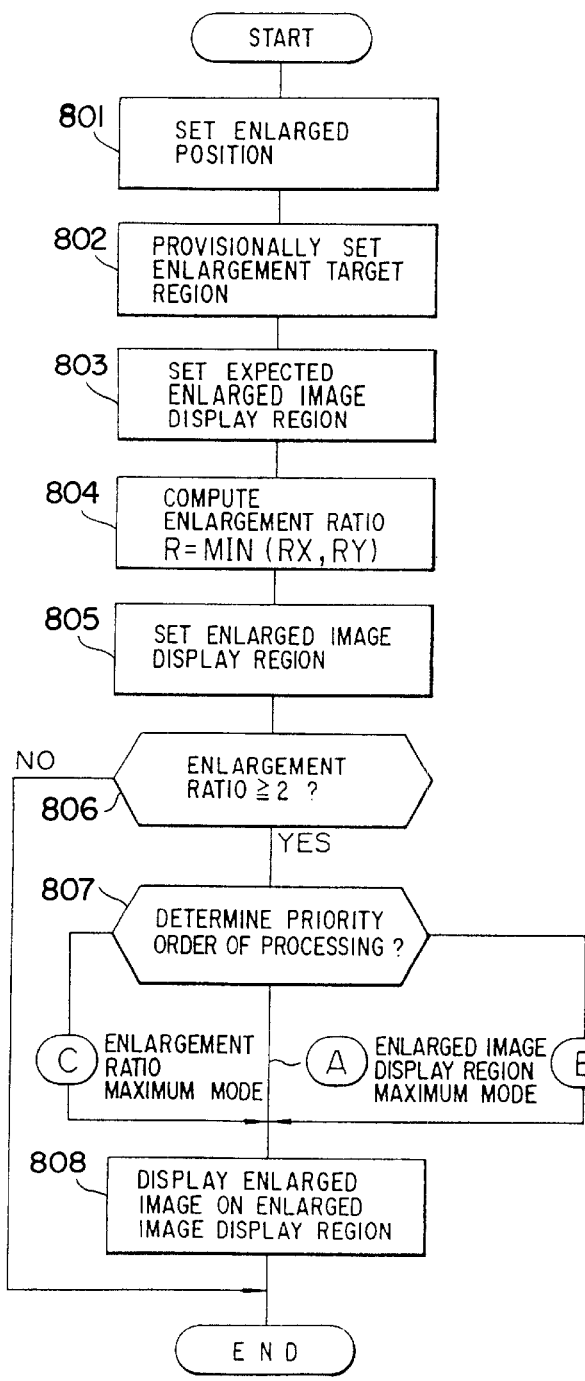
FIGS. 8A, 8B and 8C are a flow chart showing the steps of processing executed in the illustrated embodiment.
Figure 8B:
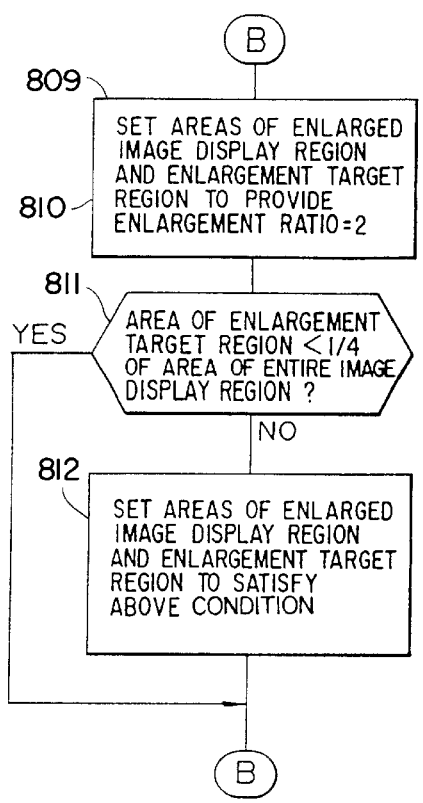
Figure 8C:
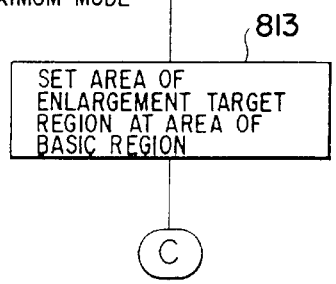

FIGS. 8A, 8B and 8C, described above in reference with FIGS. 6A, 6B and 6C, show in detail a flow chart of the routines of the automatic disposition method according to the various manners of preferential processing described above. That is, FIGS. 8A, 8B and 8C show in detail the routines in the enlarged image display region maximum mode, the enlargement target region maximum mode and the enlargement ratio maximum mode respectively.

FIGS. 1A, 1B and 1C show examples of map displays provided by the illustrated embodiment of the present invention. In each of FIGS. 1A, 1B and 1C, an entire original map before being enlarged is shown on the left-hand side, and, in this case, the map of Japan is displayed on the entire map display region 26. FIG. 1A illustrates, by way of example, the case of pointing a point marked "+" (The Miura Peninsula and its neighborhood) as a target to be enlarged, as shown on the left-hand side. The map displayed in an enlarged scale is shown on the right-hand side of FIG. 1A. The margin region 23 is provided so that the enlargement target region 22 and the enlarged map can be clearly distinguished from each other, and the enlarged map is displayed on the window provided in the entire original map. The enlargement target region 22 is surrounded by a frame, and a leading line 201 is displayed between the enlargement target region 22 and the enlarged map so that the enlarged map is easily visible. FIG. 1A represents the enlarged map display region maximum mode, and the target region 22 including the Tokyo Bay and the Miura Peninsula is enlarged to provide an enlarged map covering the wide district. On the other hand, FIG. 1B represents the enlargement target region maximum mode. In this case, almost all of the entire Kanto district is enlarged in an area ratio of about 4, so that even very small characters on the entire original map can be easily read. Further, FIG. 1C represents the enlargement ratio maximum mode. In this case, although the target region 22 is close to a point on the entire original map, the protruding end of the Miura Peninsula is greatly enlarged on the enlarged map. In this case too, the margin region 23 which is sufficiently wide from the aspect of visibility is displayed between the enlargement target region 22 and its enlarged map so as to also display the neighborhood of the target region 22 surrounded by a dotted frame. Thus, the positional relation between the enlargement target region 22 and its enlarged map is very clearly and easily recognized.

In modifications of the illustrated embodiment, the area of the enlargement target region 22, the area of the enlarged map display region 25 and the enlargement ratio R may be preferentially fixed at suitable values, or these fixed values may be combined with the aforementioned processing executed for computing the maximum values.

When the area of the enlarged map display region 25 is fixed the value of YW' (or XW') used in the expression determining the length Ly (or Lx) between the center of the enlargement target region 22 and the center of the expected enlarged map display region 24 is preferably fixed in the processing in which the area of the enlargement target region 22 is preferentially maximized. Further, when the value of the enlargement ratio R is fixed, the expression determining the length Ly (or Lx) between the center of the enlargement target region 22 and the center of the expected enlarged map display region 24 is solved, so that the ratio between each side of the enlargement target region 22 and that of the enlarged map display region 25 provides the predetermined enlargement ratio R. Other combinations can be readily understood from the above description and need not be described in detail.

Figure 9A:
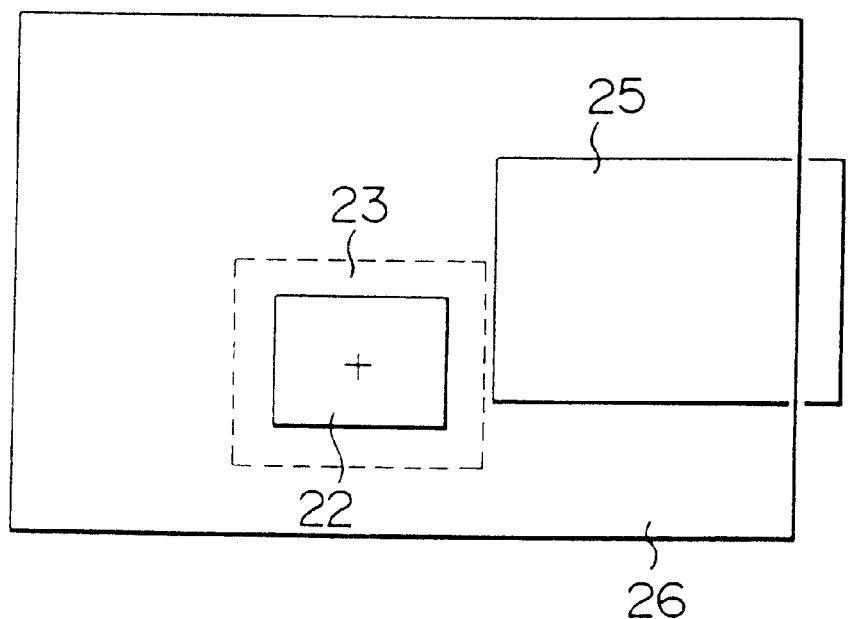
FIGS. 9A, 9B, 9C and 9D illustrate the manner of automatic disposition of an enlargement target region by scrolling

Another embodiment of the present invention will now be described. In the first embodiment described above, the enlarged map (image) is automatically disposed on the display screen without changing the location of the enlargement target region 22 on the display screen. However, when the enlargement target region 22 is located in the vicinity of the center of the display screen, such a case may arise where the desired enlarged image cannot be displayed from the aspect of, for example, the enlargement ratio R. FIG. 9A illustrates such a case. It will be seen in FIG. 9A that, when the area of the enlargement target region 22 located in the vicinity of the center of the display screen is fixed, the expected enlarged image display region 24 which permits enlargement of the target region according to the desired enlargement ratio R=2 cannot be provided on the display screen.

Figure 9B:
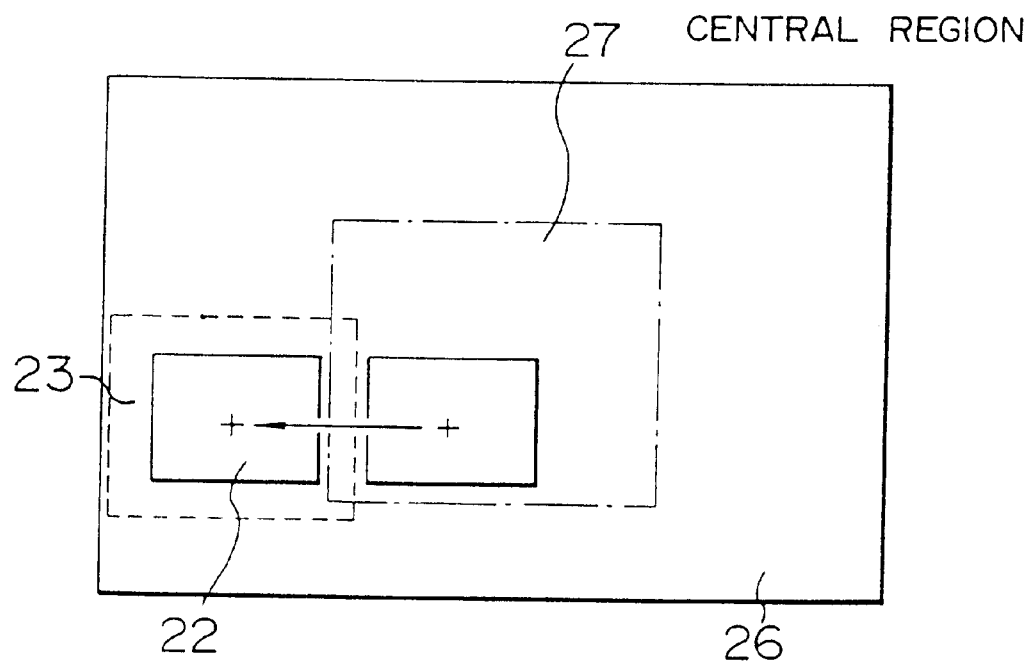
Figure 9C:
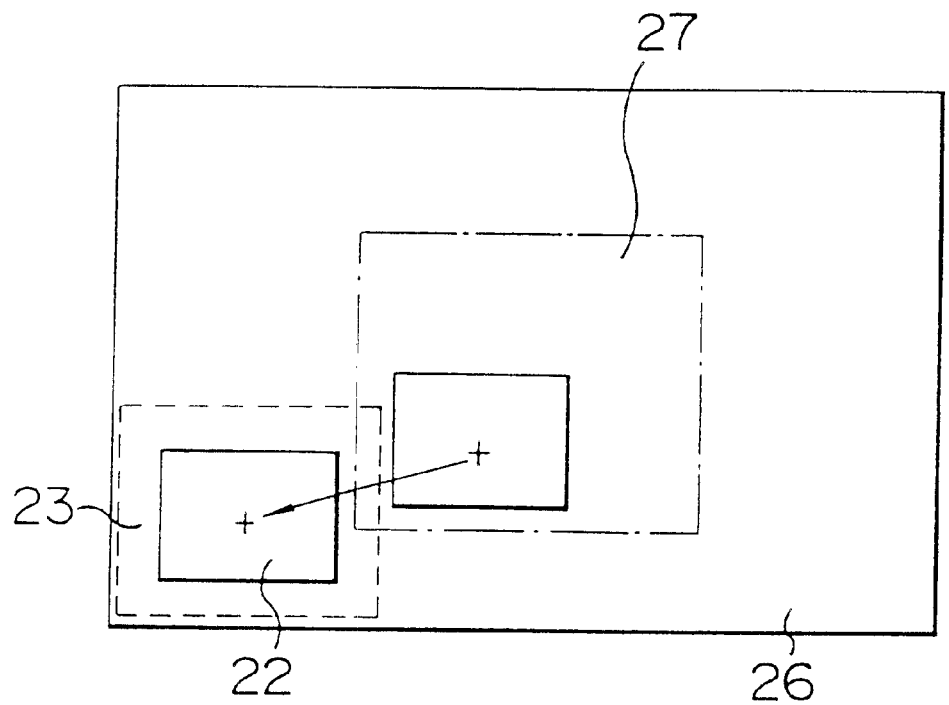
Figure 9D:
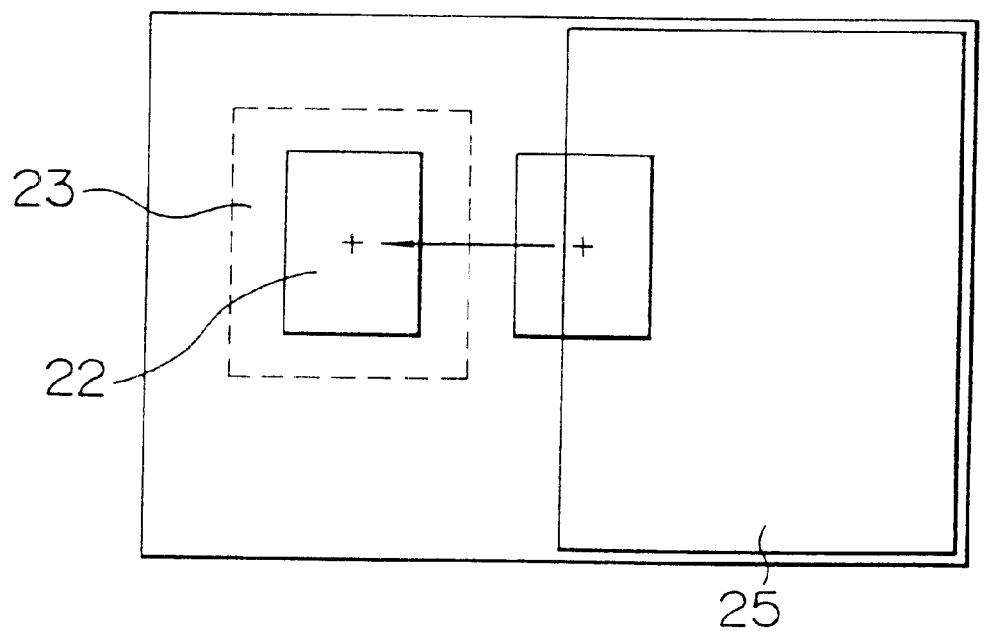

To deal with such a disadvantage, whether or not the enlargement target region 22 is located in a predetermined area occupying, for example, ¼ of the central area, (referred to hereinafter as the central region 27) of the entire display region 26 is decided in this second embodiment. When the result of decision proves that the target region 22 exists in this central region 27, the entire original image is shifted on the display screen by the scrolling function of the display editing means 16 in the computer 12. This shift occurs in a horizontal or vertical direction as shown in FIG. 9B or in a diagonal direction as shown in FIG. 9C. The amount of this shifting movement can be easily computed from the expression determining the length Ly (or Lx) between the center of the enlargement target region 22 and the expected enlarged map display region 24. Further as shown in FIG. 9D, the target region 22 may be scrolled, and the enlarged image display region 25 may always have a fixed pattern occupying ½ of the area of the display screen in a horizontal or vertical direction.

Figure 10A:
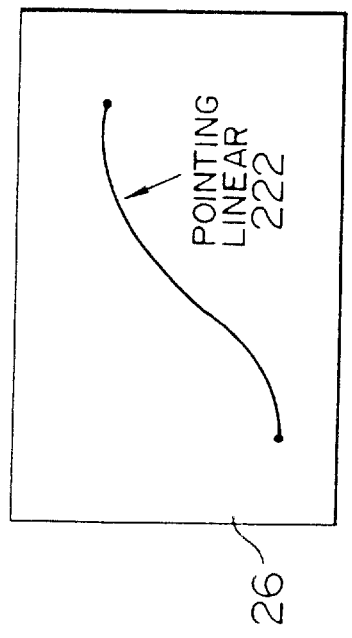
FIGS. 10A, 10B and 10C illustrate the manner of automatic disposition of an enlarged image while specifying an enlargement target region by pointing a line (a linear FIGS. 11A and 11B illustrate the manner of automatic disposition when an enlarged-image display inhibited region is provided on the display screen.
Figure 10C:
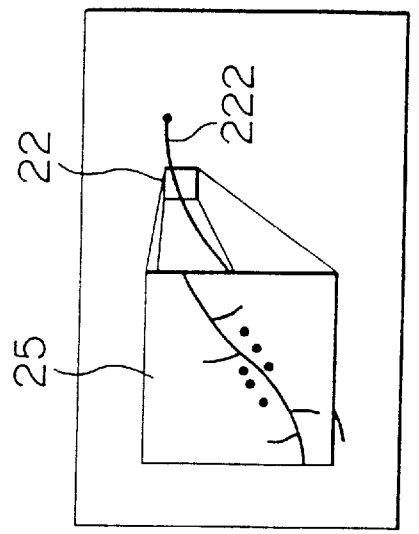
Figure 10B:
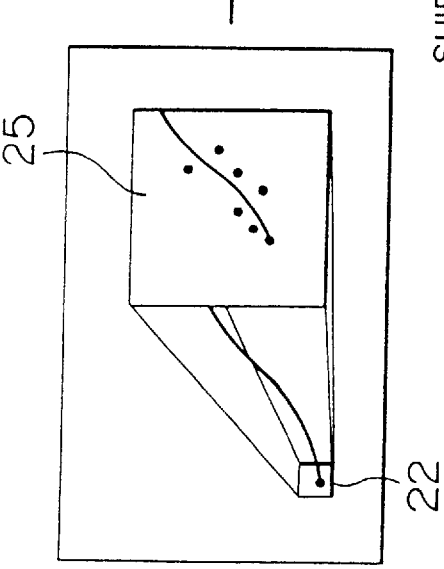

Still another embodiment of the present invention is shown in FIGS. 10A, 10B and 10C. In the embodiments described above, the enlargement target region 22 is directly specified on the display screen by a pointing device such as a mouse. In the method described already, a fixed region around the point specified by pointing is computed and set. In another method, a pattern surrounding the specified point on the display screen is taken as a target of enlargement, and a frame circumscribing the pattern is set as the enlargement target region. (In this case, the area of the enlargement target region has a fixed value.) These practical means are already commonly known in the art and need not be described in detail.

The manner of automatic disposition in the third embodiment is featured in that, as shown in FIG. 10A, a line 222 which may be a straight line or a curve is specified on the display screen 26 by a pointing device such as a mouse so as to attain automatic disposition of the enlargement target region 22. In this case, the start point and the end point only of the line 222 may be specified. Also, the pointing device may only specify that such a line will be provided. Then, as shown in FIGS. 10B and 10C, the enlarged image 25 is automatically disposed according to the aforementioned steps of processing while shifting the enlargement target region 22 along the line 222 which has been or is to be specified. In this case, the enlargement target region 22 is set around the point on the specified line 222 each time the target region 22 is shifted by a predetermined amount. In another case, the predetermined shifting amount of the target region 22 may be changed according to the (shifting) rate of pointing. Also, it is possible that the enlargement target region 22 to be enlarged is set roughly and closely when the pointing rate is high and low respectively. In still another case, the entire original image may also be scrolled with the shifting movement of the enlargement target region 22, so that both the enlargement target region 22 and its enlarged image can be displayed with the desired arrangement or with the desired enlargement ratio. Such manner of display is effective for the purpose of, for example, navigation in which an enlarged image is displayed one after another along a specific road on a road map displayed on the display screen for searching the desired destination.

Figure 11A:
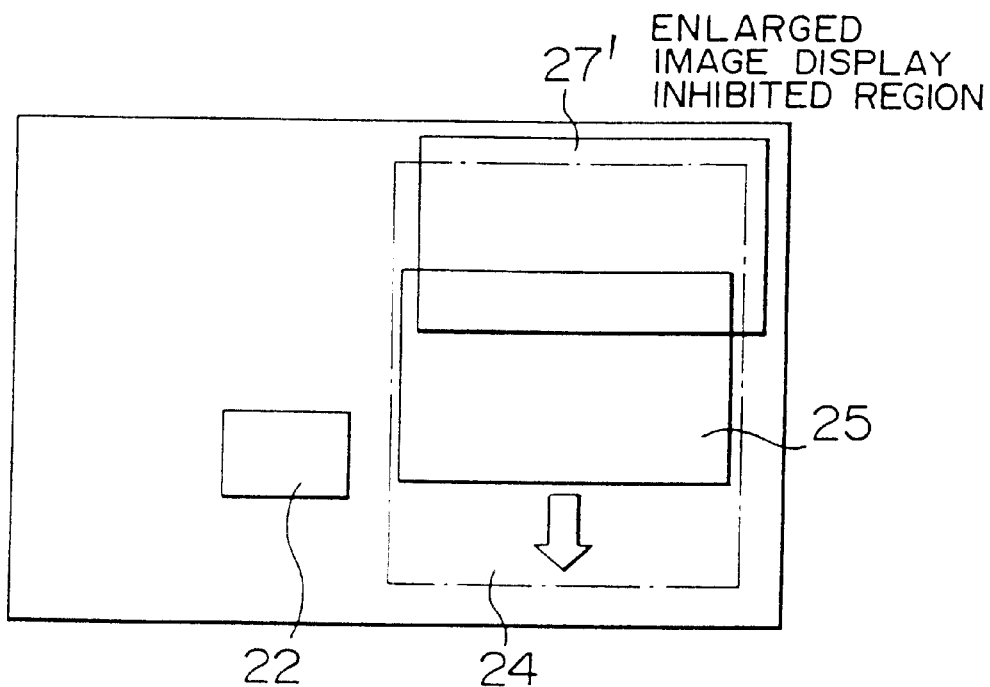
Figure 11B:
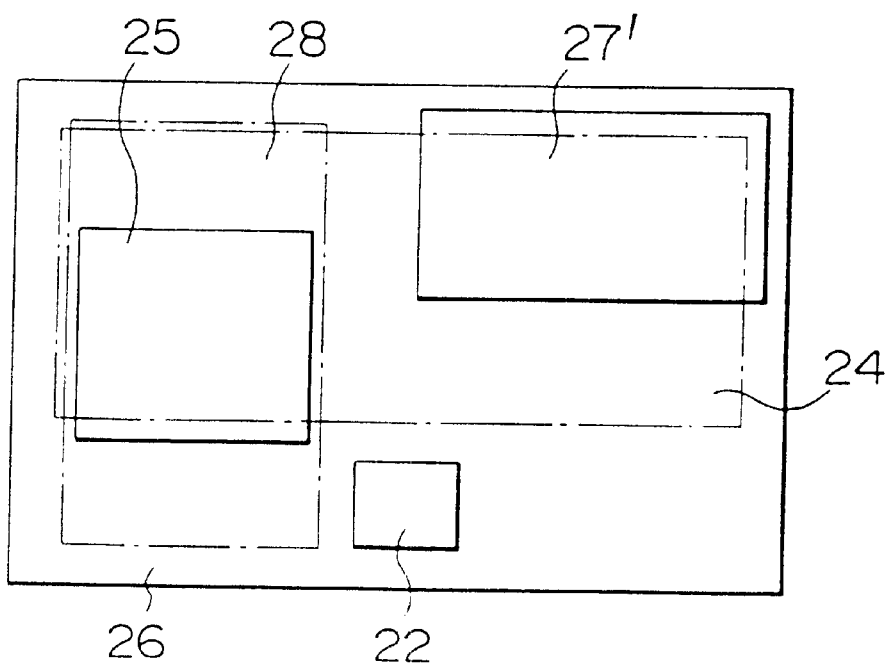

A further embodiment of the present invention is shown in FIGS. 11A and 11B. Referring to FIG. 11A, an erase inhibited part, that is, an enlarged-image display inhibited region 27' on which an enlarged image cannot be displayed, is set on an entire original image displayed on the display screen 26. This region 27' is provided so as to display information important for viewing an enlarged image, for example, "legends", "orientation symbols", etc. in the case of, for example, a road map.

For the purpose of automatic disposition in this fourth embodiment, the expected enlarged image display region 24 is first determined according to the aforementioned steps of processing, as shown in FIG. 11A. When the enlarged image display region 25 in this region 24 overlaps the display inhibited region 27', the region 25 is translated within the region 24 as shown by the arrow, so that the enlarged image display region 25 is set display the enlarged image at the location where the region 25 does not overlap the region 27'. If this shifting of the region 25 does not still satisfy the predetermined condition for enlargement, a second larger rectangular expected enlarged image display region 28 is sought in the entire display region 26 so as to display the enlarged image on this region 28. When the setting of this second expected region 28 does not still satisfy the predetermined condition for enlargement, the enlargement target region 22 is scrolled, and the aforementioned processing is then executed.

A still further embodiment of the present invention is shown in FIGS. 12 and 13. In the aforementioned embodiments, the enlargement target region 22 is directly specified by pointing on the display screen. However, there arises frequently the necessity for a successively applying data of place names, etc. as an input to an input unit so as to seek their positions on an entire original image thereby displaying an enlarged image on the display screen. In the embodiment of the apparatus shown in FIG. 12, a key word is applied as an input thereby pointing the enlargement target region. In FIG. 12, like reference numerals are used to designate like or equivalent units and parts appearing in FIG. 5.

Referring to FIG. 12, a key word is applied as an input from a keyboard or the like to an input unit 11. Managing and control means 15 identifies the input code as the key word and transfers the key word data to information retrieval means 18. The information retrieval means 18 seeks pattern information or position information coinciding with the key word data. For this purpose, the information retrieval means 18 seeks related information stored in a character string data table 31 as shown in FIG. 13. In this character string data table 31, coded character strings and attribute data numbers stored in an attribute data table 32 are registered in pairs.

The key word input is collected with the character strings stored in the character string data table 31 so as to seek the character storing including all or part of the data of the key word, and the attribute data number corresponding to the sought character string is obtained. A plurality of attribute data numbers may be obtained. In such a case, a plurality of character strings are displayed on the display screen so as to select the desired character string. Thus, only one attribute data number is finally obtained, so that the data coinciding with the attribute data number is selected from those registered in the attribute data table 32 storing the related information. This data specifies the coordinates of the representative position where the pattern specified by the character string is registered or specifies the address of the memory in which the pattern is registered.

After the representative position is sought, the basic region having its center located at this representative position is selected as the enlargement target region. On the other hand, when the memory address is specified, a rectangular region circumscribing the pattern is selected as the enlargement target region. The coordinate information of this enlargement target region is supplied through the managing and control means 15 to an enlarged-image automatic disposition computing means 17 which computes a window for the enlarged image display region according to the method described above, and the enlarged image is displayed in the window.

A plurality of key word information may be collectively stored so as to successively display a plurality of enlarged images, or information sought by a program stored in a separate system may be derived and used as the key word information. Thereafter, the present invention is very useful.

Thus, the enlarged image displaying method of the present invention is highly efficient from the aspect of actuality in that, by merely directly specifying an enlargement target on an entire original image or applying a key word input indicating the enlargement target, the desired enlarged image is automatically disposed and displayed on the display screen.

A yet further embodiment of the present invention is shown in FIGS. 14A, 14B, 14C and 14D. In this fifth embodiment, a figure or data different from a pattern or map displayed on the enlargement target display region 22 is displayed on the enlarged image display region 25. FIG. 14A shows that a sectional figure is displayed on the region 25, FIG. 14B shows that a space figure is displayed on the region 25, and FIG. 14C shows that character data is displayed on the region 25. A line 201 shown in FIG. 14A indicates the sectioned part, and an arrow 202 shown in FIG. 14B indicates the fixation line of the space figure. On the basis of these instructions, an analytical computing means 19 shown in FIG. 12 computes the section or the shape of the solid so as to display the sectional figure or the space figure. The character data shown in FIG. 14C is stored data having a hierarchial relation with image display data, or attribute data stored in relation to specific patterns, positions or the like.

It will be understood from the foregoing detailed description that the present invention can attain automatic disposition and display of an enlarged image and an enlargement target region by merely specifying a single enlargement target position by an input device or applying a key word input for seeking the enlargement target position. Therefore, the apparatus can be very easily actuated.

Further, because one of the factors including the area of the enlargement target region, the area of the enlarged image display region and the value of the enlargement ratio is preferentially selected among others, and the other values can then be changed, the flexibility of image disposition is very high, so that any desired enlarged image can be displayed.

Further, navigation is greatly facilitated because the automatic disposition of the enlarged image can be attained while shifting the enlargement target position along a specified line.

Furthermore, because a suitable margin region is provided between the enlargement target region and the enlarged image, and the neighborhood of the target region is displayed on this margin region, the positional relation and configuration of the enlarged image can be accurately recognized, and the display is easily visible.

We claim:

1. An image displaying method, comprising the steps of:
   displaying predetermined information on a display screen;
   pointing to specify a target on said display screen where said predetermined information is displayed;
   preserving a region including said specified target and a predetermined peripheral range thereof on said display screen; and
   displaying without overlap at the same time, over said predetermined information, a corresponding enlarged image region pertaining to said specified target and said preserved region including said specified target;
   said displaying step including the step of:
      automatically arranging said preserved region including said specified target and said enlarged image region based on a size of said preserved region, a size of said enlarged image region and a value of an enlargement ratio between said preserved region and said enlarged image region.

2. An image displaying method, in an image displaying apparatus, of enlarging a specified region in an entire original image displayed on a display screen and displaying the enlarged specified region on said display screen, said method comprising the steps, performed by said image displaying apparatus, of:
   pointing, by use of an input device, to specify a target on said display screen;
   selecting one of a plurality of conditions including an area of an enlargement target region including said specified target, an area of an enlarged image display region and a value of an enlargement ratio between said enlargement target region and said enlarged image display region;
   determining other values so as to satisfy said selected condition; and
   simultaneously displaying without overlap said enlargement target region and said enlarged image display region on said display screen over said entire original image on the basis of said determined values;
   said simultaneous displaying step including the step of:
      automatically arranging said enlargement target region and said enlarged image display region based on said selected condition.

3. An image displaying method, in an image displaying apparatus, of simultaneously displaying on a display screen an enlargement target region specified in an entire original image displayed on said display screen and an enlarge image display region displaying an enlarged image display region displaying an enlarged image of said enlargement target region, said method comprising the steps, performed by said image displaying apparatus, of:
   pointing by use of an input device, to specify a target on said display screen;
   setting said enlarged image display region so as to be spaced apart by a predetermined distance on said display screen from said enlargement target region and to preferentially satisfy one of a plurality of selected conditions including an area of said enlargement target region, an area of said enlarged image display region and a value of an enlargement ratio between said enlargement target region and said enlarged image display region; and
   displaying without overlap at the same time on said display screen over said entire original image said enlarged image on said enlarged image display region;
   said simultaneous displaying step including the step of:
      automatically arranging said enlargement target region and said enlarged image display region based on said selected condition.

4. An image displaying method according to claim 3, wherein said enlargement target region includes a peripheral region adjoining a region corresponding to said enlarged image displayed on said enlarged image display region.

5. An image displaying method according to claim 3, wherein, when said enlargement target region is located in a central region of said display screen, said entire original image is scrolled so as to display said enlargement target region on the outside of said central region.

6. An image displaying method according to claim 3, wherein a pointing line drawn by a point shifting on said display screen is used to specify said enlargement target region so as to set said enlargement target region each time said point on said line shifts by a predetermined amount, and while shifting said enlargement target region along said line, both said enlargement target region and said enlarged image display region are automatically disposed and displayed on said display screen.

7. An image display method according to claim 6, wherein said predetermined amount of shift of said point is variable according to the rate of pointing.

8. An image displaying method, in an image displaying apparatus, of simultaneously displaying on a display screen an enlargement target region specified in an entire original image displayed on said display screen and an enlarged image; of enlargement target region, said method comprising the steps, performed by said image displaying apparatus, of:
   determining values of an area of said enlargement target region so that said area of said enlargement target region on said display screen is maximized under a predetermined enlarging condition; and
   according to said determined values automatically disposing and displaying without overlap both said enlargement target region and said enlarged image display region on said display screen over said entire original image said disposing and displaying step including the step of:
automatically arranging said enlargement target region and said enlarged image display region based on a size of said enlargement target region, a size of said enlarged image display region and an enlargement ratio of said enlargement target region and said enlarged image display region.

9. An image displaying method according to claim 8, wherein said enlargement target region includes a peripheral region adjoining a region corresponding to said enlarged image displayed on said enlarged image display region.

10. An image displaying method according to claim 8, wherein, when said enlargement target region is located in a central region of said display screen, said entire original image is scrolled so as to display said enlargement target region on the outside of said central region.

11. An image displaying method according to claim 8, wherein a pointing line drawn by a point shifting on said display screen is used to specify said enlargement target region so as to set said enlargement target region each time said point on said line shifts by a predetermined amount, and while shifting said enlargement target region along said line, both said enlargement target region and said enlarged image display region are automatically disposed and displayed on said display screen.

12. An image displaying method according to claim 11, wherein said predetermined amount of shift of said point is variable according to the rate of pointing.

13. An image displaying apparatus for displaying an enlarged part of an entire original image displayed on a display screen of displaying means, comprising:
input means for pointing to specify a target to be enlarged in said entire original image; and
automatic disposing means for deciding, according to a predetermined basic rule, whether an area of an enlargement target region including said specified target on said display screen or an area of an enlarged image display region displaying an enlarged image representing details of said target in said enlargement target region is to be preferentially selected, and on the basis of the result of said decision, automatically disposing and displaying without overlap both said regions to be easily distinguishable on the same display screen over said entire original image;
said automatic disposing means including means for automatically arranging said enlargement target region and said enlarged image display region based on a size of said enlargement target region, a size of said enlarged image display region and an enlargement ratio of said enlargement target region and said enlarged image display region.

14. An image displaying apparatus according to claim 13, wherein said automatic disposing means includes means for preferentially specifying one of a plurality of selected conditions including an area of said enlargement target region, an area of said enlarged image display region and a value of an enlargement ratio between said enlargement target region and said enlarged image display region, and means for computing values of said area of said enlargement target region, said area of said enlarged image display region and said enlargement ratio according to, said selected condition.

15. An image displaying apparatus according to claim 14, wherein at least one of said values is fixed according to said selected condition.

16. An image displaying apparatus according to claim 14, wherein the other values except that selected are computed so that said selected value becomes a maximum or close to a maximum under the given condition.

17. An image displaying apparatus according to claim 13, wherein said enlargement target region and said enlarged image display region are displayed in a non-overlapping relation so that they can be readily clearly distinguished from each other.

18. An image displaying apparatus according to claim 13 wherein a peripheral region having an area and adjoining said enlargement target region is disposed between said enlargement target region and said enlarged image display region so that said region can be readily clearly distinguished from each other.

19. An image displaying apparatus according to claim 13, wherein a plurality of lead lines or a frame is displayed so that said enlargement target region and said enlarged image display region can be readily compared with and distinguished from each other.

20. An image displaying apparatus according to claim 13, wherein, when said enlargement target region is located in a central region of said display screen, said entire original image is scrolled so that said enlargement target region may not be displayed in said central region and can be readily clearly distinguished from said enlarged image display region.

21. An image displaying apparatus according to claim 13, wherein said input means has a function of pointing to specify said enlargement target by a line drawn by shifting a point on said display screen, and said automatic disposing means acts to automatically dispose and display said enlarged image display region in relation to said enlargement target region set each time said point on said line shifts by a predetermined amount.

22. An image displaying apparatus according to claim 13, wherein said input means is associated with means responsive to a key word input for seeking a corresponding position on said display screen.

23. An image displaying apparatus according to claim 13, wherein the enlarged image displayed on said enlarged image display region represents related information including a sectional figure, an explanatory figure and/or attribute data which is not displayed on said enlargement target region.

24. An image displaying apparatus for simultaneously displaying an entire original image and its partly enlarge image on the same display screen, comprising:
input means for pointing to specify a target to be enlarged;
means for setting an enlargement target region including said specified target;
means for determining a maximized enlarged image display region which does not overlap said enlargement target region on said display screen;
means for providing priority to one of a plurality of selected conditions including an are of said enlargement target region an area of said enlarged image display region and a value of an enlargement ratio between said enlargement target region and said enlarged image display region;
means for setting said area of said enlargement target region at a predetermined minimum value when said value of said enlargement ratio is preferentially selected, setting said enlargement ratio at a predetermined minimum value when said area of said enlargement target region is preferentially selected, setting said area of said enlarged image display region at that of said maximized enlarged image display region when said area of said enlarged image display region is preferentially selected, and determining other values; and automatic disposing means for automatically disposing without overlap both said enlargement target region and said enlarge image display region on the basis of the result of computation of said area of said enlargement target region and said area of said enlarged image display region;

said automatic disposing means including means for automatically arranging said enlargement target region and said enlarged image display region based on one of a plurality of selected conditions provided with priority.

25. An image displaying apparatus according to claim 13, wherein said maximized enlarged image display region is set so as not to overlap an enlarged image display inhibited region previously set and displayed on said display screen.

26. An image displaying apparatus according to claim 24, wherein said input means has a function of pointing to specify said enlargement target by a line drawn by shifting a point on said display screen, and said automatic disposing means acts to automatically dispose and display said enlarged image display region in selection to said enlargement target region set each time said point on said line shifts by a predetermined amount.

27. An image displaying apparatus according to claim 26, wherein said predetermined amount of shift of said point is variable according to the rate of pointing.

28. An image displaying apparatus according to claim 24, wherein said predetermined amount of shift of said point is variable according to the rate of pointing.

29. An image displaying apparatus according to claim 24, wherein said input means is associated with means responsive to a key word input for seeking 1 corresponding position on said display screen.

30. An image displaying apparatus according to claim 24, wherein the enlarged image displayed on said enlarged image display region represents related information including a sectional figure, an explanatory figure and/or attribute data which is not displayed on said enlargement target region.

* * * * *